(12) United States Patent
Takeda et al.

(10) Patent No.: US 8,511,333 B2
(45) Date of Patent: Aug. 20, 2013

(54) DOUBLE PIPE APPARATUS

(75) Inventors: Noriyuki Takeda, Tokyo (JP); Shoichi Doi, Hyogo (JP)

(73) Assignees: Mitsubishi Heavy Industries, Ltd., Tokyo (JP); Pebble Bed Modular Reactor (Pty) Limited, Centurion (ZA)

( * ) Notice: Subject to any disclaimer, the term of this patent is extended or adjusted under 35 U.S.C. 154(b) by 125 days.

(21) Appl. No.: 12/746,842

(22) PCT Filed: Mar. 27, 2009

(86) PCT No.: PCT/JP2009/056999
§ 371 (c)(1),
(2), (4) Date: Aug. 18, 2010

(87) PCT Pub. No.: WO2009/119919
PCT Pub. Date: Oct. 1, 2009

(65) Prior Publication Data
US 2010/0308574 A1 Dec. 9, 2010

(30) Foreign Application Priority Data
Mar. 28, 2008 (JP) .................................. 2008-088743

(51) Int. Cl.
*F16K 31/00* (2006.01)
*F16K 23/00* (2006.01)

(52) U.S. Cl.
USPC ..................................... 137/312; 251/335.3

(58) Field of Classification Search
USPC .................. 137/335.1, 335.3, 318, 312, 375; 251/335.1, 335.3
See application file for complete search history.

(56) References Cited

U.S. PATENT DOCUMENTS

| 316,697 A | * | 4/1885 | Hoevenbergh | ................... | 178/40 |
| 1,807,139 A | * | 5/1931 | Volodimirov | .................... | 403/50 |
| 2,856,151 A | * | 10/1958 | Peters | ........................... | 251/330 |

(Continued)

FOREIGN PATENT DOCUMENTS

| EP | 0584434 A1 | 3/1994 |
| FR | 2087313 A5 | 12/1971 |

(Continued)

OTHER PUBLICATIONS

Machine Translation of Bebe JP 10288276A_Oct. 27, 1998.*

(Continued)

*Primary Examiner* — Stephen M Hepperle
*Assistant Examiner* — Kevin Barss
(74) *Attorney, Agent, or Firm* — Westerman, Hattori, Daniels & Adrian, LLP

(57) ABSTRACT

A double pipe apparatus that includes an outer pipe and an inner pipe inserted into the outer pipe, and regulates a flow of a gas flowing through the double pipe apparatus. The double pipe apparatus includes a flow regulating valve, a valve stem which which penetrates the outer pipe and the inner pipe, and fluid leakage preventing parts including a bellows which is provided between the outer pipe and the inner pipe and which prevents the gas from leaking outside the outer pipe. One end of the bellows is attached to an inner wall of the outer pipe, and the other end of the bellows is attached to a flange formed on the valve stem, so that the gas flowing through the inner pipe is prevented from leaking outside the outer pipe.

2 Claims, 3 Drawing Sheets

(56) References Cited

U.S. PATENT DOCUMENTS

| | | | | |
|---|---|---|---|---|
| 3,315,700 A | * | 4/1967 | Greenwood | 137/375 |
| 3,573,863 A | * | 4/1971 | Doors et al. | 137/375 |
| 3,759,282 A | * | 9/1973 | Kaldenback et al. | 137/68.14 |
| 3,774,881 A | * | 11/1973 | Gregory | 251/335.3 |
| 4,214,727 A | * | 7/1980 | Baram | 251/63.4 |
| 5,379,982 A | * | 1/1995 | Koyomogi et al. | 251/77 |
| 5,385,334 A | * | 1/1995 | Greenwood et al. | 251/335.3 |
| 5,597,009 A | * | 1/1997 | Scherrer et al. | 137/375 |
| 6,178,989 B1 | * | 1/2001 | Windschmitt et al. | 137/312 |
| 6,311,950 B1 | * | 11/2001 | Kappel et al. | 251/129.06 |

FOREIGN PATENT DOCUMENTS

| | | |
|---|---|---|
| JP | 57-154578 A | 9/1982 |
| JP | 6-58459 A | 3/1994 |
| JP | 9-054189 A | 2/1997 |
| JP | 10-288276 A | 10/1998 |
| JP | 2003-294883 A | 10/2003 |
| JP | 3971683 B2 | 9/2007 |

OTHER PUBLICATIONS

International Search Report of PCT/JP2009/056999, Mailing Date of Jul. 24, 2009.

Japanese Office Action mailed May 22, 2012, issued in corresponding Japanese Patent Application No. 2010-524012, with English translation (9 pages).

Decision to Grant a Patent for corresponding Japnese Patent Application No. 2010-524012, issued on Jun. 11, 2013.

* cited by examiner

DOUBLE PIPE APPARATUS

TECHNICAL FIELD

The present invention relates to a double pipe apparatus which prevents fluid flowing through an outer pipe and an inner pipe from leaking.

BACKGROUND ART

Conventionally, a pipe of a single structure is normally used as a pipe through which fluid such as gas flows from a gas source to a turbine. There is a pipe of a double pipe structure in which a pipe is disposed inside another pipe, the inside pipe (hereinafter, referred to as inner pipe,) is inserted into the outside pipe (hereinafter, referred to as outer pipe) in a state where a predetermined gap is held between the inner and outer pipes, two kinds of gases sent from an upstream location such as a supply source path through the outer pipe and the inner pipe, and the gases are supplied to a downstream location such as a predetermined discharging destination (Patent Document 1).

The double pipe structure, for example, is also used in a piping system in spent nuclear fuel processing facility, radio-active-waste treatment facility, and nuclear power facility (Patent Documents 2 and 3).
Patent Document 1 The Publication of Japanese Patent No. 3971683
Patent Document 2 Japanese Unexamined Patent Application, Publication No. H09-54189
Patent Document 3 Japanese Unexamined Patent Application, Publication No 0.2003-294883

DISCLOSURE OF INVENTION

In the conventional double pipe apparatus, however, since it is necessary to operate a valve which regulates a flow of gas flowing through the outer pipe and the inner pipe by means of a valve stem from outside, there is a problem that gas leaks from a gap between the valve stem and the outer pipe.

In view of the above problem, it is an object of the present invention to provide a double pipe apparatus which prevents gas flowing through the outer pipe and the inner pipe from leaking outside the outer pipe.

In order to achieve the above object, according to a first aspect of the present invention, a double pipe apparatus which includes an outer pipe and an inner pipe inserted into the outer pipe, and which regulates a flow of a fluid flowing through the double pipe apparatus, the double pipe apparatus includes: a flow regulating valve which regulates a flow of the fluid flowing through the outer pipe or the inner pipe; a valve stem which supports the flow regulating valve and which penetrates the outer pipe and the inner pipe; and fluid leakage preventing parts including a bellows or another expansion joint which is provided between the outer pipe and the inner pipe and which prevents the fluid from leaking outside the outer pipe.

According to a second aspect of the present invention, in a double pipe apparatus of the first aspect, one end of the bellows is attached to an inner wall of the outer pipe, and another end of the bellows is attached to the valve stem.

According to the above aspects, the double pipe apparatus includes the outer pipe, the inner pipe, the flow regulating valve which regulates the flow of the fluid flowing through the outer pipe or the inner pipe, the valve stem which supports the flow regulating valve and which penetrates the outer pipe and the inner pipe, and the fluid leakage preventing parts which is provided between the outer pipe and the inner pipe and which includes the bellows or another expansion joint for preventing the fluid from leaking outside the outer pipe. Therefore, it is possible to prevent gas flowing through the outer pipe and the inner pipe from leaking outside the outer pipe.

DESCRIPTION OF SYMBOLS

Figure 1:
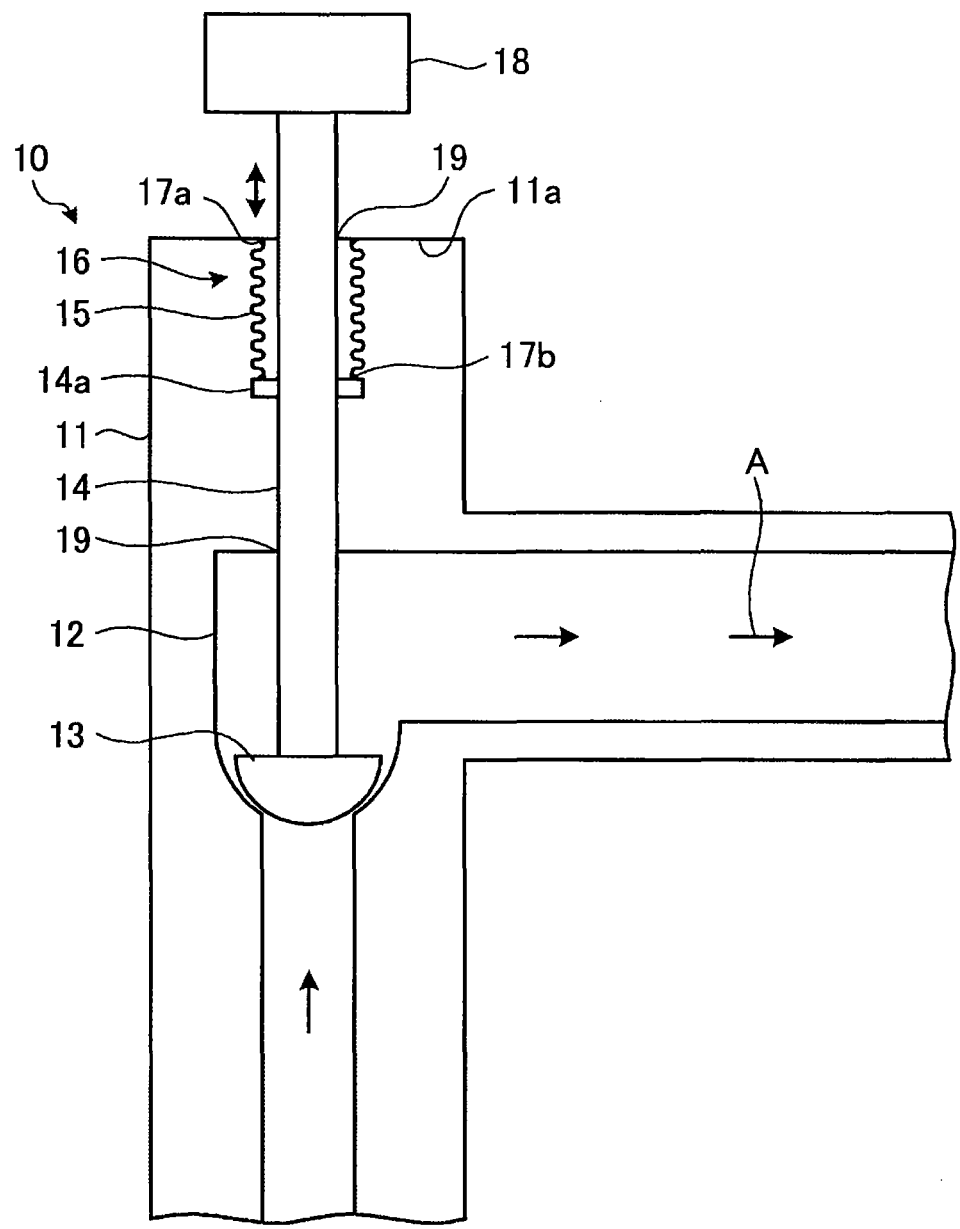
FIG. 1 is a schematic diagram showing a configuration of a double pipe apparatus according to an embodiment.

10 double pipe apparatus
11 outer pipe
11a inner wall
12 inner pipe
13 flow regulating valve
14 valve stem
14a flange
15 bellows
16 fluid leakage preventing parts
17a, 17b mounting portion
18 valve-regulating mechanism
19 sealing portion
A gas

BEST MODE FOR CARRYING OUT THE INVENTION

The present invention will be described in detail with reference to the drawings. The present invention is not limited to the following embodiment.

Example 1

Figure 2:
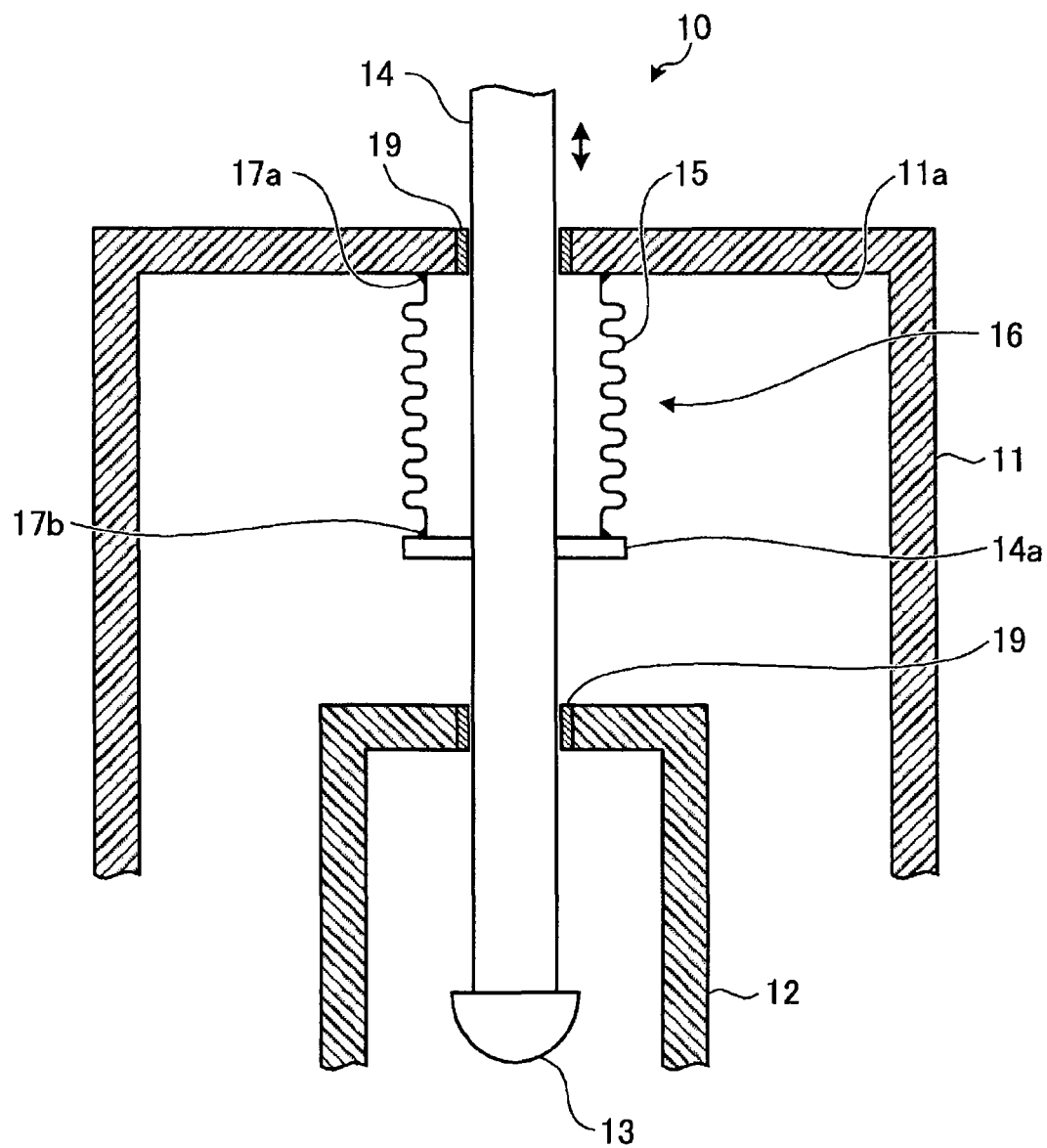
FIG. 2 is a schematic diagram showing the configuration of the double pipe apparatus shown in FIG. 1.

A double pipe apparatus according to an embodiment 1 of the present invention will be described with reference to the drawings.
FIG. 1 is a schematic diagram showing a configuration of the double pipe apparatus according to the present embodiment. FIG. 2 is a schematic diagram showing the configuration of the double pipe apparatus shown in FIG. 1.

As shown in FIGS. 1 and 2, a double pipe apparatus 10 of the present embodiment includes an outer pipe 11 and an inner pipe 12 inserted into the outer pipe 11. The double pipe apparatus 10 regulates a flow of gas A flowing therethrough. The double pipe apparatus 10 includes a flow regulating valve 13 which regulates the flow of the gas A flowing through the inner pipe 12, and a valve stem 14 which supports the flow regulating valve 13 and penetrates the outer pipe 11 and the inner pipe 12. The double pipe apparatus 10 also includes fluid leakage preventing parts 16 having a bellows 15 between the outer pipe 11 and the inner pipe 12. The bellows 15 prevents the gas A from leaking outside the outer pipe 11.

In the double pipe apparatus 10 of the present embodiment, the fluid leakage preventing parts 16 includes the bellows 15, a mounting portion 17a at which one end (upper end in the drawing) of the bellows 15 is attached to an inner wall 11a of the outer pipe 11, a flange 14a formed on the valve stem 14, a mounting portion 17b at which the other end (lower end in the drawing) of the bellows 15 is attached to the flange 14a, and sealing portions 19 provided between the valve stem 14 and the outer pipe 11 and between the valve stem 14 and the inner pipe 12 for preventing gas from leaking.

By attaching the one end (upper end in the drawing) of the bellows 15 to the inner wall 11a of the outer pipe 11, and by attaching the other end (lower end in the drawing) to the flange 14a formed on the valve stem 14 like the fluid leakage preventing parts 16, it is possible to prevent the gas A flowing through the inner pipe 12 from leaking outside the outer pipe 11.

The bellows 15 is provided in the space between the outer pipe 11 and the inner pipe 12. Accordingly, since the gas A flowing through the inner pipe 12 does not come into direct contact with the bellows 15, it is possible to prevent the bellows 15 from being deteriorated in durability and to improve safety even in a case where gas under an extremely severe condition flows through the inner pipe 12.

In this embodiment, the bellows 15 is joined by such as welding at the mounting portions 17a and 17b between the inner wall 11a of the outer pipe 11 and the flange 14a. However, the attaching method of the bellows 15 is not limited to the above, and other attaching method such as bolting may be employed.

Figure 3:
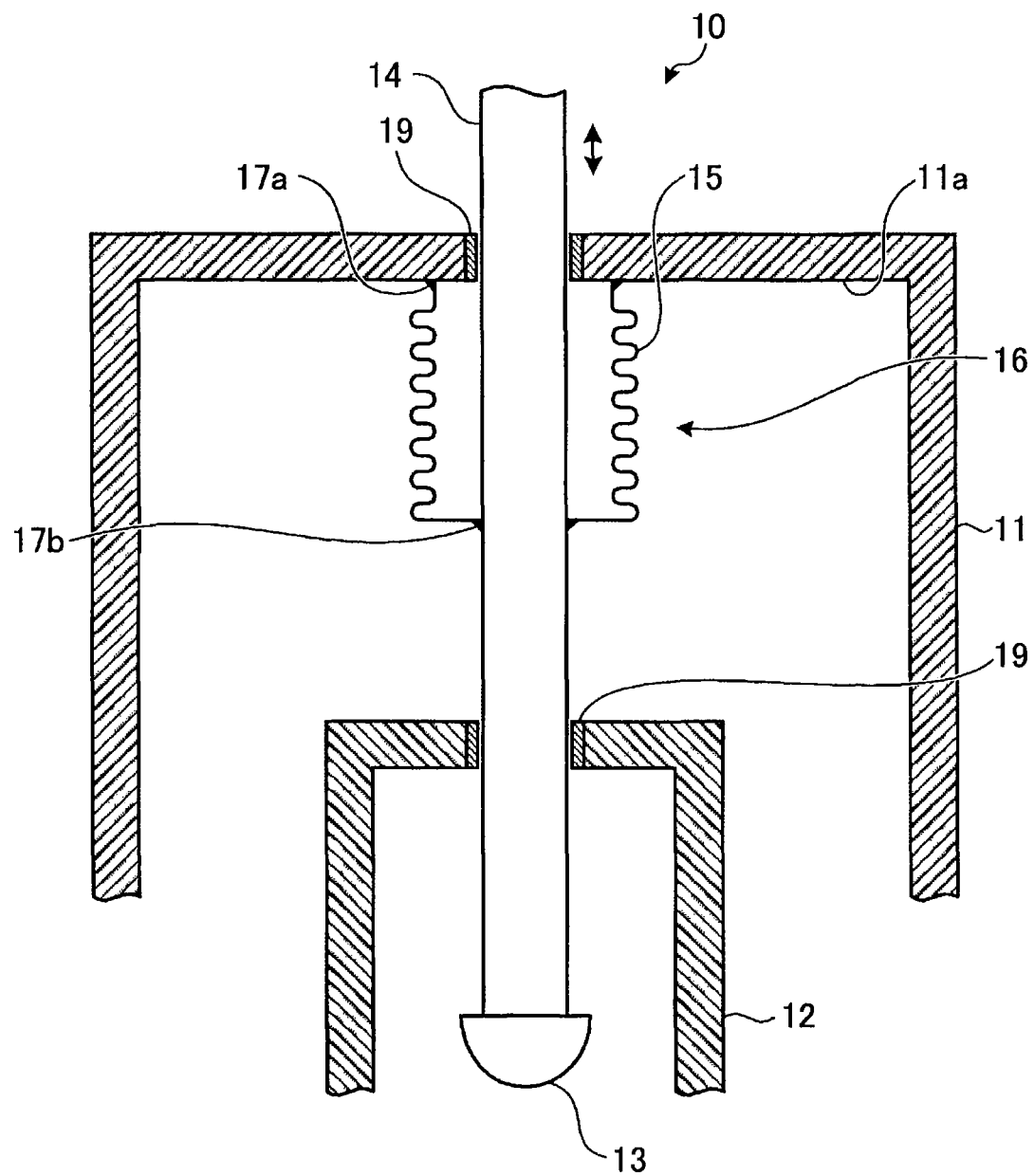
FIG. 3 is a schematic diagram showing another configuration of the double pipe apparatus according to the present embodiment.

The lower end of the bellows 15 is attached to the valve stem 14 through the flange 14a. However, the invention is not limited thereto, the other end (lower end in the drawing) of the bellows 15 may be attached directly to the valve stem 14, and the valve stem 14 may have the mounting portion 17b as shown in FIG. 3.

The double pipe apparatus 10 of the present embodiment includes a valve-regulating mechanism 18 which vertically moves the flow regulating valve 13 through the valve stem 14. The valve-regulating mechanism 18 regulates the flow of the gas A flowing through the outer pipe 11 and the inner pipe 12. In this configuration, it is possible to regulate the flow of the gas A supplied from a gas source (not shown) such as gas turbine facility to a predetermined discharging destination.

The gas A is fluid which is gas or liquid supplied from the outer pipe 11 and the inner pipe 12. The gas A is, for example, included safe gas and liquid such as inert gas composed of such as nitrogen gas and argon gas which are heated to high temperature by heat emitted from a high temperature gas furnace and are supplied to a turbine.

The material for the outer pipe 11 and the inner pipe 12 may appropriately be selected in accordance with properties of the gas A passing therethrough and the surrounding environment. The pipes are, for example, steel pipes, stainless steel pipes, iron pipes, resin pipes, and iron pipes with resin-coated inner surfaces.

In this embodiment, the bellows 15 is used as the fluid leakage preventing parts 16 in the double pipe apparatus 10. Only if the vertical motion of the valve stem 14 can be absorbed by the fluid leakage preventing part 16, and it has sealing performance and elasticity. For the present invention, the fluid leakage preventing parts 16 are not limited to the bellows 15.

In the double pipe apparatus 10 of the present embodiment, the sealing portions 19 are provided between the valve stem 14 and the outer pipe 11 and between the valve stem 14 and the inner pipe 12, so that gas sealed. Ground packing, for example, is carried out by the sealing portion 19. In this configuration, it is possible to suppress the gas A flowing from the outer pipe 11 into the inner pipe 12. Even in a case where the bellows 15 is damaged, it is possible to minimize the quantity of that the gas A flowing through the outer pipe 11 and the inner pipe 12 leaks outside the outer pipe 11.

the double pipe apparatus of the present embodiment includes the outer pipe 11 and the inner pipe 12 inserted into the outer pipe 11, and regulates the flow of the gas A flowing therethrough. The double pipe apparatus includes the flow regulating valve 13 which regulates the flow of the gas A flowing through the inner pipe 12, the valve stem 14 which supports the flow regulating valve 13 and penetrates the outer pipe 11 and the inner pipe 12, and the fluid leakage preventing parts 16 having a bellows 15 which is provided between the outer pipe 11 and the inner pipe 12 and prevents the gas A from leaking outside the outer pipe 11. Therefore, it is possible to prevent the gas A flowing through the inner pipe 12 from leaking outside the outer pipe 11.

The bellows 15 is provided in the space between the outer pipe 11 and the inner pipe 12, and the gas A flowing through the inner pipe 12 does not come into direct contact with the bellows 15. Therefore, even in a case where gas under an extremely severe condition flows through the inner pipe 12, the bellows 15 is not deteriorated in durability and reliability of the apparatus is kept high. Even in a case where the bellows 15 is damaged, the risk that fluid flows outside can be lowered to an extremely low level, since the sealing portion 19 is also provided at the portion where the valve stem 14 penetrates the outer pipe 11.

In the double pipe apparatus 10 of the present embodiment, the bellows 15 can resist high temperature and high pressure. Since the pipe of the double pipe apparatus 10 of the present embodiment is of the double structure, the pipe can be used under the high temperature and high pressure condition, and the pipe can be used as a pipe of a high temperature gas furnace which supplies inert gas composed of such as nitrogen gas and argon gas which are heated to high temperature by heat emitted from a high temperature gas furnace and are supplied to a turbine. In this case, the pressure in the outer pipe 11 and the inner pipe 12 becomes as high as about 9 MPa, and the temperature of the gas between the outer pipe 11 and the inner pipe 12 becomes as high as about 200° C., and the temperature in the inner pipe 12 becomes as high as about 500° C.

When the double pipe apparatus 10 of the present embodiment is used as a pipe of the high temperature gas furnace, the bellows 15 is formed such that it can resist the high temperature and high pressure. Then, it is possible to prevent the gas A flowing through the outer pipe 11 and the inner pipe 12 from leaking outside the outer pipe 11.

In this embodiment, the sealing portions 19 are provided both between the valve stem 14 and the outer pipe 11 and between the valve stem 14 and the inner pipe 12. However, the present invention is not limited thereto, and the sealing portion 19 may be provided only between the valve stem 14 and the outer pipe 11 or between the valve stem 14 and the inner pipe 12.

The double pipe apparatus used in the present embodiment is not limited to the pipe of the high temperature gas furnace, and the double pipe apparatus may be of a pipe structure having the double pipe, and the present invention can also be used for other steam turbine or gas turbine facility such as a pressure vessel, a circulation pump, or a valve.

INDUSTRIAL APPLICABILITY

As described above, the double pipe apparatus according to the present invention includes the outer pipe and the inner pipe, the bellows is provided between the outer pipe and the inner pipe for preventing the fluid from leaking outside the outer pipe. In this configuration, it is possible to prevent the fluid flowing through the outer pipe or the inner pipe from leaking outside the outer pipe. Therefore, the present invention is suitable for a double pipe apparatus of a double structure having the outer pipe and the inner pipe.

The invention claimed is:

1. A double pipe apparatus which includes an outer pipe and an inner pipe inserted into the outer pipe, and which regulates a flow of a fluid flowing through the double pipe apparatus, the double pipe apparatus comprising:
- a flow regulating valve which regulates a flow of the fluid flowing through the outer pipe or the inner pipe;
- a valve stem which supports the flow regulating valve, penetrates the outer pipe and the inner pipe, and vertically moves along a longitudinal direction thereof; and
- fluid leakage preventing parts including a bellows or another expansion joint, wherein
- the fluid leakage preventing parts are located in a space between an inner wall of the outer pipe and an outer wall of the inner pipe,
- a first end of the fluid leakage preventing parts is attached to the inner wall of the outer pipe, and a second end of the fluid leakage preventing parts is completely positioned at the space between the inner wall of the outer pipe and the outer wall of the inner pipe,
- the fluid flowing through the double pipe apparatus does not come into direct contact with the fluid leakage preventing parts in any position of the valve, and
- the fluid leakage preventing parts prevent the fluid from leaking outside of the outer pipe.

2. The double pipe apparatus according to claim 1, wherein a second end of the fluid leakage preventing parts is attached to the valve stem.

* * * * *

UNITED STATES PATENT AND TRADEMARK OFFICE
CERTIFICATE OF CORRECTION

PATENT NO. : 8,511,333 B2  Page 1 of 1
APPLICATION NO. : 12/746842
DATED : August 20, 2013
INVENTOR(S) : Takeda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 127 days.

Signed and Sealed this
Fifteenth Day of September, 2015

Michelle K. Lee
*Director of the United States Patent and Trademark Office*